Patented Jan. 11, 1927.

1,614,281

UNITED STATES PATENT OFFICE.

JOHN WOOLMAN CHURCHMAN, OF NEW YORK, N. Y., ASSIGNOR TO NATIONAL ANILINE & CHEMICAL COMPANY, INC., OF NEW YORK, N. Y., A CORPORATION OF NEW YORK.

GERMICIDE.

No Drawing.    Application filed July 13, 1923. Serial No. 651,434.

This invention relates to compositions having antiseptic qualities and is particularly directed to improvements in germicides having especial utility for their bactericidal and bacteriostatic properties, and which may serve as valuable therapeutic agents.

The new compositions of the present invention are made up of substances of opposite selective bactericidal properties which together supplement the action of each other, such that the composition is bactericidal for all or practically all organisms. The new compositions are made by compounding a substance, such as a triphenylmethane dye, having normal selective bactericidal power, with a substance, such as acridine dye, having reverse selective bactericidal power, whereby the resulting composition is of practically universal bactericidal power, and is not subject to the limitations of the component ingredients of the composition.

The new compositions of the present invention are composed of ingredients which not only have selective bactericidal or bacteriostatic properties, but which have properties that supplement and reenforce the properties of each other, so that the selective shortcomings of one substance or ingredient are fortified by the selective potencies of the other. One or more of the ingredients of the composition has normal selective bactericidal power, while one or more of the ingredients has the reverse selective bactericidal power.

It has heretofore been observed that certain substances, and particularly certain dyestuffs, exhibit selective bactericidal or bacteriostatic properties which run substantially parallel with the Gram-reaction. The Gram-reaction is a staining method for classifying bacteria; and bacteria are said to be Gram-positive if they stain by this method and Gram-negative if they do not. Most pathogenic cocci are Gram-positive while most pathogenic bacilli, except the spore-bearing ones, are Gram-negative. It has been observed for example that certain basic triphenylmethane dyes save a selective action toward living bacteria and that this selective bactericidal action is such that when Gram-positive organisms are subjected thereto the organisms are killed (bactericidal action) or inhibited (bacteriostatic action), while Gram-negative organisms are in general resistant or unaffected. This selective germicidal or bactericidal action on Gram-positive bacteria, but not on Gram-negative bacteria, I have designated as normal. This normal selective action has been applied by bacteriologists to the isolation of pure cultures from mixtures, and in the elimination of spurious presumptive tests in potable water and in milk for the colon bacillus. It has also proven of definite value in the treatment of infected joints and in the selective sterilization of infected wound surfaces and serous cavities. It has also been observed that certain other substances exhibit the reverse or opposite bactericidal or bacteriostatic selectivity in that they kill or inhibit Gram-negative organisms and have little or no effect on the Gram-positive ones. This action I have designated as reverse selective bactericidal action in order to distinguish it from the above mentioned normal action.

Certain of the substances which have been observed to show a selective bactericidal power have been used or proposed for use for bactericidal purposes, particularly where a selective bactericidal effect has been desired. Since the time of Ehrlich however the main emphasis in the chemo-therapeutic field has been laid on the improvement of parasitocidal or bactericidal substances by chemical manipulation of the molecule, whereby a specific substance might be produced or obtained having specific or general therapeutic action. In the present invention, however, I have departed from this principle and I have established the principle of supplementary selective bacteriostasis.

According to the present invention I accomplish the improvement of bactericidal properties, not by chemical manipulation of the molecule, but by using a mixture of dyes of opposite selective capacities, and thus fortifying the weakness of one by the strength of the other, and obtaining a mixture or composition possessing a high degree of extrinsic bacteriostatic capacity for both Gram-positive and Gram-negative organisms.

I have found that compositions compounded of or containing mixtures of one or more substances having normal selective bactericidal action and one or more substances having reverse bactericidal action are efficacious as antiseptics or germicides toward most, if not all, the commoner bacteria. I have found that such compositions or mixtures possess bactericidal or bacteriostatic qualities for both the Gram-negative organisms and the Gram-positive bacteria, and including the spore-bearing aerobes; and that the ingredients of the composition supplement the action of each other and enable results to be obtained which are not obtainable with the ingredients alone. For example, I have found that a solution containing the normal and reverse substances was efficacious as a germicide, in a strength in which the normal or reverse substance acting alone would be ineffective against certain groups of organisms.

For simplicity I will refer to the substances which exhibit selective bactericidal or bacteriostatic properties for or toward Gram-positive organisms as "Gram-positive substances"; and substances which exhibit selective bactericidal or bacteriostatic properties for or toward Gram-negative organisms as "Gram-negative substances."

The Gram-positive substances and Gram-negative substances which are compounded in making the new compositions should be such as do not react with each other to neutralize or destroy the selective bactericidal properties. The Gram-positive substances may for example be triphenylmethane dyes having normal bactericidal power, and particularly basic triphenylmethane dyes. Gentian violet, which is a mixture of crystal violet (80 parts) and methyl violet (10 parts) with or without dextrin (10 parts) is a particularly effective Gram-positive substance when used, for example, with a Gram-negative substance such as acriflavine. Among other Gram-positive substances may be mentioned crystal violet, methyl violet, etc. The Gram-negative substances which I have found of special value in the new compositions are neutral dyes of the acridine series and particularly neutral flavine dyes such as acriflavine, neutral proflavine, etc. The basic triphenylmethane dyes and the neutral acridine dyes can be compounded without objectionable reaction.

The invention will be further illustrated by the following specific examples but it will be understood that the invention is not limited thereto. The parts are by weight.

10 parts of gentian violet and 10 parts of neutral acriflavine are intimately mixed and dissolved in 2000 parts of boiling water. The solution is allowed to cool and the cool solution is kept as a stock solution in a brown glass container or bottle. The strength (1 to 100) of this stock solution is usually diluted to a strength of 1 to 500 when the solution is to be used for example by applying it to the surface of wounds in the treatment of granulating surfaces or for saturation of gauze to be packed into the granulated wounds.

The dry ingredients may be compounded with each other in the desired proportions and the resulting composition marketed and used for making a solution of the desired strength when needed. For example, equal parts by weight of the gentian violet and neutral acriflavine may be intimately mixed, and formed into tablets or packaged in capsules, etc. so that a single tablet or capsule contains a definite amount of the composition suitable for making a solution of definite strength when dissolved in a given amount of water. Instead of compounding the ingredients in a dry state, they may be compounded in solution to form a strong or saturated solution of definite content of the ingredients such that it can be diluted with a predetermined amount of water to give a solution of appropriate strength for use.

The new compositions can be used for various purposes where a practically universal bactericidal effect is desired. They are of special value for the treatment of infection, but can also be used for obtaining substantially bacteria free or sterile results in places or solutions which are desired to be kept free from infection or to make free from bactericidal infection. Industrial solutions may be treated with the composition and. where the ingredients of the composition may be objectionable in the sterilized product, they may be precipitated and removed therefrom by appropriate chemical treatment. For example, the compositions may be used in sterilizing or preserving sugar solutions and the dyestuffs can be subsequently precipitated by chemical treatment and removed from the solution.

The nature and proportions of the ingredients of the composition can be varied. In cases where the predominating organism is known to be of a Gram-negative type, an increased amount of the acriflavine can be used, for example, two parts of acriflavine to one part of gentian violet; while in cases where the predominating organisms are known to be of the Gram-positive type the relative proportions may be reversed, e. g. to two parts of gentian violet and one part of acriflavine. The ingredients in the desired proportions may be ground together or mixed in any suitable way and kept either in a dry condition as a powder or in the form of tablets, etc. until wanted for use, or in the form of a concentrated or strong solution. In the above example the gentian violet may be substituted by crystal violet, methyl violet, etc. while neutral proflavine or other flavine dyes may be used in place of acriflavine. The compositions are of more or less general use and can be compounded with other ingredients for making ointments, salves, etc. for the treatment of cuts, bruises, etc.

Certain substances which are Gram-negative but which are strongly acid in character cannot be used with Gram-positive substances which are basic in character because of the reaction which such acid and basic substances undergo when brought together in solution. Acid fuchsin, which is acid in character and which is Gram-negative, cannot be used with gentian violet which is basic. Accordingly, in compounding the new compositions I use substances of oppositely selective capabilities which can be compounded with each other without objectionable interaction and destruction of the selective capacities of the respective substances.

It may be pointed out that the ingredients of the composition if used alone in sufficiently strong concentrations, may kill or inhibit substantially all organisms, while if the concentrations are too weak they may be without effect on any of the organisms. Between these two limiting extremes of concentration, however, there exists a considerable range of concentrations of the dyes where the selective effects are obtained. Between these limits, the Gram-positive substances affect the Gram-positive organisms, and the Gram-negative substances the Gram-negative organisms. The effective concentrations also depend on the specific organisms; for example, a solution of neutral acriflavine too weak to have any effect on Gram-positive spore bearers kills or inhibits most Gram-negative organisms. On the other hand, although mixtures of Gram-positive and Gram-negative organisms may not be affected, or may be very little affected, when treated with weak concentrations of gentian violet alone or of neutral acriflavine alone, yet when exposed to the action of substantially similar concentrations of a mixture containing both gentian violet and acriflavine substantially all of the organisms of both groups are killed or inhibited.

In addition to the superior advantages as antiseptics exhibited by compositions containing both gentian violet and neutral acriflavine on the commoner Gram-negative organisms and on the Gram-positive spore-bearers, such compositions also exhibit superior advantages as germicidal agents on certain Gram-positive non-spore bearers such as for example *Staphylococcus aureus*, a species of bacteria commonly causing clinical infection. The bactericidal power of the compositions adapts them for use for treating fecal matter and of destroying or retarding growth of bacteria therein.

It will thus be seen that the invention provides a new composition having important advantages and being of general and practically universal application for bactericidal or bacteriostatic purposes. It will further be seen that the invention is a composition comprising substances of opposite selective bactericidal properties of which the action of one supplements and modifies the action of the other so that the composition itself is of general application where it is desired to kill or inhibit organisms of various kinds, both Gram-positive and Gram-negative in character.

It has been found that it is almost impossible to tell in a given experiment whether the bacteria have been actually killed or simply inhibited. In view of this fact the term "bactericidal action," as used in the claims, is also intended to cover any bacteriostatic action. "Bacteriostasis" is used to mean the inhibition not only of bacteria but of all micro-organisms. The word "germicide" is intended to cover a substance which kills or inhibts the growth of micro-organisms. The word "antisepsis" is used to include the treatment of infected material in order to kill the micro-organisms or inhibit their growth and also the treatment of uninfected material to prevent infection.

I claim:

1. A germicide composition comprising a substance having a selective bactericidal action against Gram-positive bacteria and a substance having a selective bactericidal action against Gram-negative bacteria, the said substances being capable of being compounded together without objectionable interaction or destruction of the selective bactericidal capacities of the respective substances.

2. A germicide composition comprising a non-acid substance exerting a selective bactericidal action on Gram-positive bacteria and a non-acid substance exerting a selective bactericidal action on Gram-negative bacteria which substances can be compounded together without objectionable interaction or destruction of the selective bactericidal capacities of the respective substances.

3. A germicide composition comprising a basic triphenylmethane dye and a dye which exerts selective bactericidal action against Gram-negative bacteria and which can be compounded with the triphenylmethane dye without objectionable interaction or destruction of the selective bactericidal capacities of the respective dyes.

4. A germicide composition comprising a basic triphenylmethane dye and a neutral acridine dye, said composition having a bactericidal or bacteriostatic action on both Gram-positive and Gram-negative bacteria.

5. A germicide composition comprising gentian violet and a non-acid dye of the acridine series having a selective action on Gram-negative bacteria and which can be compounded with gentian violet without objectionable interaction or destruction of the selective bactericidal capacities of the respective substances.

6. A germicide composition comprising gentian violet and neutral acriflavine.

7. A germicide composition comprising gentian violet and neutral acriflavine in approximately equal proportions.

8. A germicide composition comprising a dyestuff having selective bactericidal properties toward Gram-positive bacteria and a dyestuff having selective bactericidal properties toward Gram-negative bacteria, said dyestuffs being capable of being compounded together without objectionable interaction or destruction of their respective selective bactericidal properties.

In testimony whereof I affix my signature.

JOHN WOOLMAN CHURCHMAN.